(12) United States Patent
Forehand

(10) Patent No.: US 9,151,445 B2
(45) Date of Patent: Oct. 6, 2015

(54) CAUTION AND WARNING BARRIER SYSTEM FOR DANGER OF ELECTRICAL ARCING

(71) Applicant: SAFE-T-ARMS, L.L.C., Macon, GA (US)

(72) Inventor: David M. Forehand, Americus, GA (US)

(73) Assignee: Safe-T-Arms, L.L.C., Macon, GA (US)

( * ) Notice: Subject to any disclaimer, the term of this patent is extended or adjusted under 35 U.S.C. 154(b) by 0 days.

(21) Appl. No.: 14/335,741

(22) Filed: Jul. 18, 2014

(65) Prior Publication Data

US 2015/0040482 A1 Feb. 12, 2015

Related U.S. Application Data

(62) Division of application No. 13/891,458, filed on May 10, 2013, now Pat. No. 8,782,935.

(60) Provisional application No. 61/646,025, filed on May 11, 2012.

(51) Int. Cl.
| | |
|---|---|
| *E01F 13/00* | (2006.01) |
| *F16P 1/00* | (2006.01) |
| *F16P 1/02* | (2006.01) |
| *G09F 15/00* | (2006.01) |
| *H02B 1/14* | (2006.01) |
| *H02B 1/30* | (2006.01) |

(52) U.S. Cl.
CPC ... *F16P 1/00* (2013.01); *F16P 1/02* (2013.01); *G09F 15/0087* (2013.01); *H02B 1/14* (2013.01); *H02B 1/306* (2013.01)

(58) Field of Classification Search
CPC .......... F16P 1/00; F16P 1/02; G09F 15/0087; H02B 1/14; H02B 1/306
USPC .................................................. 49/9, 49, 463
See application file for complete search history.

(56) References Cited

U.S. PATENT DOCUMENTS

| | | | |
|---|---|---|---|
| 1,374,471 A | 4/1921 | Reynard | |
| 1,513,017 A | 10/1924 | Thornburgh | |
| 1,561,737 A * | 11/1925 | Meyer | 49/9 |
| 1,592,241 A | 7/1926 | Welday | |
| 1,598,438 A | 8/1926 | Hallowell | |
| 1,832,232 A | 11/1931 | Mimms | |
| 1,887,894 A | 11/1932 | Schwab | |
| 2,062,479 A | 12/1936 | Ritz-Woller | |
| 2,064,127 A | 12/1936 | Schneider | |
| 3,148,856 A * | 9/1964 | Orlando | 248/205.6 |

(Continued)

FOREIGN PATENT DOCUMENTS

JP 06-019415 A 1/1994

*Primary Examiner* — Jerry Redman
(74) *Attorney, Agent, or Firm* — PatentBest; Andrew McAleavey

(57) ABSTRACT

A caution and barrier system for danger of electrical arcing is disclosed. The caution and barrier system includes at least two elongate arms that attach to respective sides of a piece of equipment. The arms carry warning indicia. Some embodiments attach via traditional mounting hardware, while others mount magnetically to the equipment. The arms may also pivot and may comprise separate sections attached together by hinges. Yet other versions of the arms may be mounted on equipment using a multi-position magnetic mount. The caution and barrier system is particularly suitable for use with high voltage apparatus where electrical arcing is likely.

16 Claims, 11 Drawing Sheets

(56) References Cited

U.S. PATENT DOCUMENTS

| | | | |
|---|---|---|---|
| 3,235,214 A | | 2/1966 | Sprung |
| 3,839,824 A | * | 10/1974 | Ellis et al. ............................ 49/34 |
| 4,026,069 A | | 5/1977 | Bohnett |
| 4,028,827 A | * | 6/1977 | Hufton ............................ 40/600 |
| 4,038,769 A | | 8/1977 | Werner |
| D255,226 S | | 6/1980 | Daniels |
| 4,309,836 A | | 1/1982 | Knapp |
| 4,574,726 A | | 3/1986 | Sullivan |
| 4,700,655 A | * | 10/1987 | Kirby ............................ 116/174 |
| 4,792,258 A | | 12/1988 | Goff |
| 4,876,812 A | * | 10/1989 | Haralson ............................ 40/592 |
| 4,878,303 A | | 11/1989 | Banniza et al. |
| 5,028,031 A | | 7/1991 | Stoudt |
| 5,040,321 A | | 8/1991 | Stoudt |
| 5,079,861 A | | 1/1992 | Stoudt |
| 5,095,642 A | | 3/1992 | George et al. |
| D327,096 S | | 6/1992 | Hobbs |
| 5,218,775 A | | 6/1993 | Singer |
| D340,290 S | | 10/1993 | Rossiter |
| 5,323,728 A | * | 6/1994 | Hjelm ............................ 116/63 T |
| 5,388,546 A | * | 2/1995 | Lombard ............................ 116/209 |
| D360,654 S | * | 7/1995 | Castilloux ............................ D20/42 |
| 5,964,052 A | | 10/1999 | Jepsen et al. |
| 6,014,828 A | | 1/2000 | Kern et al. |
| 6,023,867 A | | 2/2000 | Gagné |
| 6,634,532 B1 | * | 10/2003 | Maguire ............................ 224/483 |
| 6,678,980 B2 | | 1/2004 | Arias |
| 6,825,760 B2 | * | 11/2004 | Sawyer et al. ............................ 340/463 |
| 6,854,203 B2 | * | 2/2005 | Kern et al. ............................ 40/492 |
| 7,397,349 B2 | | 7/2008 | Lahr et al. |
| 7,404,267 B2 | | 7/2008 | Evans et al. |
| 7,530,187 B1 | * | 5/2009 | Dreka ............................ 40/591 |
| 7,866,074 B2 | | 1/2011 | McComb et al. |
| 2002/0088157 A1 | | 7/2002 | Winterton et al. |
| 2003/0089011 A1 | | 5/2003 | Haigh et al. |
| 2005/0204599 A1 | * | 9/2005 | Myles ............................ 40/591 |
| 2009/0278105 A1 | * | 11/2009 | McIlwain ............................ 256/65.02 |
| 2010/0146719 A1 | * | 6/2010 | Swessel et al. ............................ 14/71.3 |
| 2011/0222962 A1 | * | 9/2011 | Jette ............................ 404/6 |
| 2012/0017478 A1 | * | 1/2012 | Stephenson ............................ 40/606.18 |

* cited by examiner

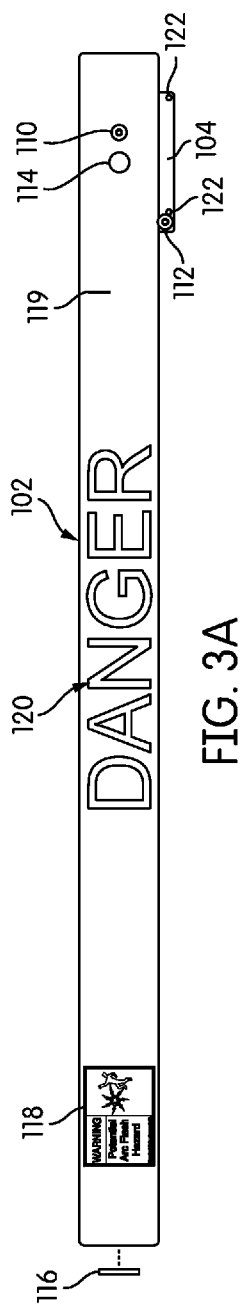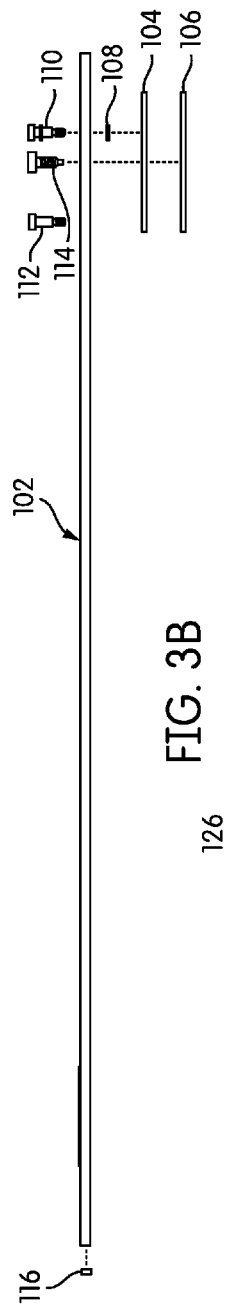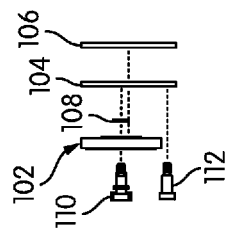

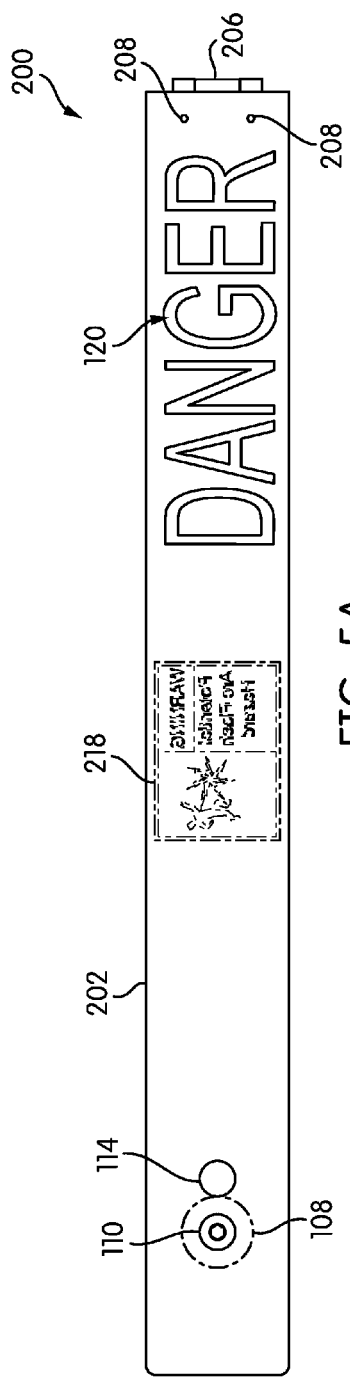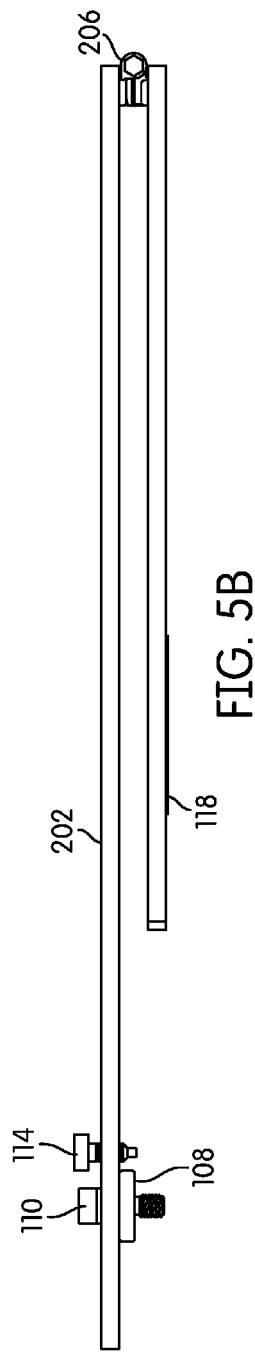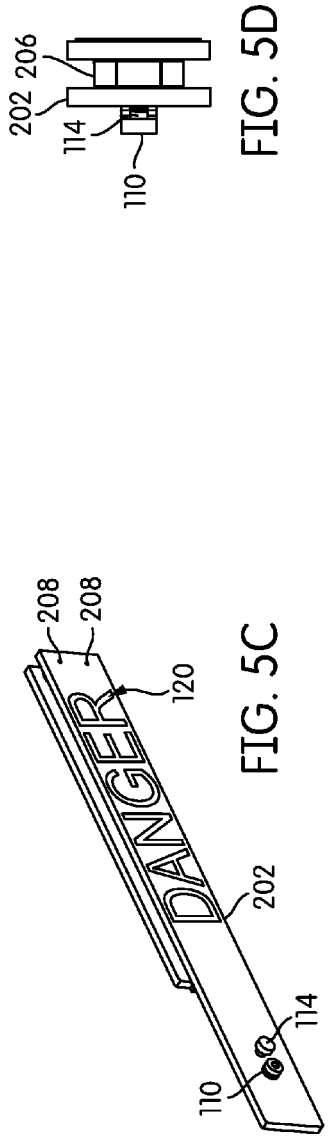

CAUTION AND WARNING BARRIER SYSTEM FOR DANGER OF ELECTRICAL ARCING

CROSS-REFERENCE TO RELATED APPLICATIONS

This application is a divisional of U.S. application Ser. No. 13/891,458, filed May 10, 2013, now U.S. Pat. No. 8,782,935, issued Jul. 22, 2014, which claims priority to U.S. Provisional Patent Application No. 61/646,025, filed on May 11, 2012. Both of those applications are incorporated by reference herein in their entireties.

BACKGROUND OF THE INVENTION

1. Field of the Invention

In general, the invention relates to electrical safety devices, and more particularly, to a caution and warning barrier system that is used to prevent personnel from entering areas in which electrical arcing is likely.

2. Description of Related Art

Electrical arcs result from the release of electrical energy through the air when high voltage bridges a gap between conductors. Electrical arcs can occur naturally, e.g., lightning, but they are also common with electrical machinery. These electrical discharges are highly unpredictable and vary in occurrence, energy, path, and duration. Electrical faults resulting in electrical arcs give off thermal radiation and bright, intense light that can cause burns to the body. High-voltage arcs can also produce a considerable pressure wave by rapidly heating the air and producing a blast that can send molten metal droplets from melted copper and aluminum components in electrical equipment great distances at extremely high velocities. In addition to direct personal injury from these hot metals, arc blasts can throw a worker against nearby objects, causing secondary injuries, such as blunt force trauma, cuts, and abrasions. The impulse sound wave near the unprotected ear can also result in temporary or permanent traumatic hearing loss. Electrical arcs can also cause non-contact flash burns without accompanying electric shock, in which case the person receiving the arc burn never actually contacts an energized electrical conductor.

The hazards of non-contact electric arc flashes are present at most industrial workplaces and are an everyday occurrence. Due to the nature and attitudes of industrial work, may workers experience electrical arcs in varying degrees, but do not report them because they are not, or do not perceive themselves to be, injured. Non-contact arcing incidents can result from human error as well as from equipment malfunctions and accidents; however, arcs are not always predictable or traceable to a particular error, malfunction, or circumstance. Sometimes, they simply occur—which is what makes them so dangerous.

Standards for protecting workers generally focus on technical skills, instrumentation, safe operating procedures, and personal protective equipment. Protective equipment, including clothing, is one way of preventing arc flash injury. Good equipment design, proper maintenance, and good training can also reduce the risk of injury. However, even with standards, protective equipment, and other conventional measures, arcing incidents still occur, and still take a toll.

SUMMARY OF THE INVENTION

Aspects of the invention relate to caution and barrier systems for electrical arcing. The barrier systems may provide safe spaces and proper caution and warning information to workers in danger of encountering electrical arcing from pieces of equipment.

One particular aspect of the invention relates to a caution and barrier system that includes a pair of elongate arms adapted to be attached to a piece of equipment with a fastening mechanism, and a removable front barrier. The arms may contain indicia in the form of warning messages, cautionary colors, or industry standard placards. The fastening mechanism may comprise a set of bolts, screws or other fasteners, along with appropriate plates and other hardware, that are intended to allow the arms to be secured to respective sides (or other faces) of the piece of equipment. Holes or openings may be made or provided in the piece of equipment for attachment of the arms. The fastening mechanism may also provide a pivoting mechanism, allowing the arms to rotate between defined vertical and horizontal positions, and stopping or locking mechanisms to prevent movement beyond those defined vertical and horizontal positions. The arms may be comprised of individual sections that are joined together with hinging mechanisms so that they may be folded to clear obstructions while in certain positions or while in motion between the vertical or horizontal positions. The removable front barrier may take different forms and may attach to the front of the elongate arms utilizing conventional releasable fasteners.

Another aspect of the invention relates to a caution and barrier system for electrical arcing. This system also includes a pair of elongate arms adapted to be attached to a piece of equipment with a fastening mechanism, and a removable front barrier. However, in embodiments according to this aspect of the invention, the fastening mechanism attaches to a ferromagnetic piece of equipment without modifying it. More particularly, the fastening mechanism may comprise a magnetic attachment system in which one or more magnetic fasteners are used to attach each arm to a side or face of the piece of equipment. Other aspects of the invention may utilize fastening mechanisms including suction cups or adhesives.

Yet another aspect of the invention relates to a stand that is adapted to support appropriate barriers with warning indicia without any contact with particular equipment.

A further embodiment of the invention relates to a caution and warning system with a "universal" magnetic mount. A pair of mounts attach magnetically to the sides of a piece of equipment. The mounts have guides that define a channel sized to support a guard arm. The guard arm is retained in the mount with a pin, and is positionable either parallel to the mount or perpendicular to it.

Other aspects, features, and advantages of the invention will be set forth in the description that follows.

BRIEF DESCRIPTION OF THE DRAWING FIGURES

The invention will be described with respect to the following pictures and drawing figures, in which like numerals represent like elements throughout the drawings, and in which:

FIGS. 3A-3D are side elevational, top plan, perspective, and end elevational views, respectively, of one of the arms of FIG. 1 in isolation;

FIGS. 5A-5D are side elevational, top plan, perspective, and end elevational views, respectively, of one of the arms of FIG. 4 in isolation;

Figure 6:
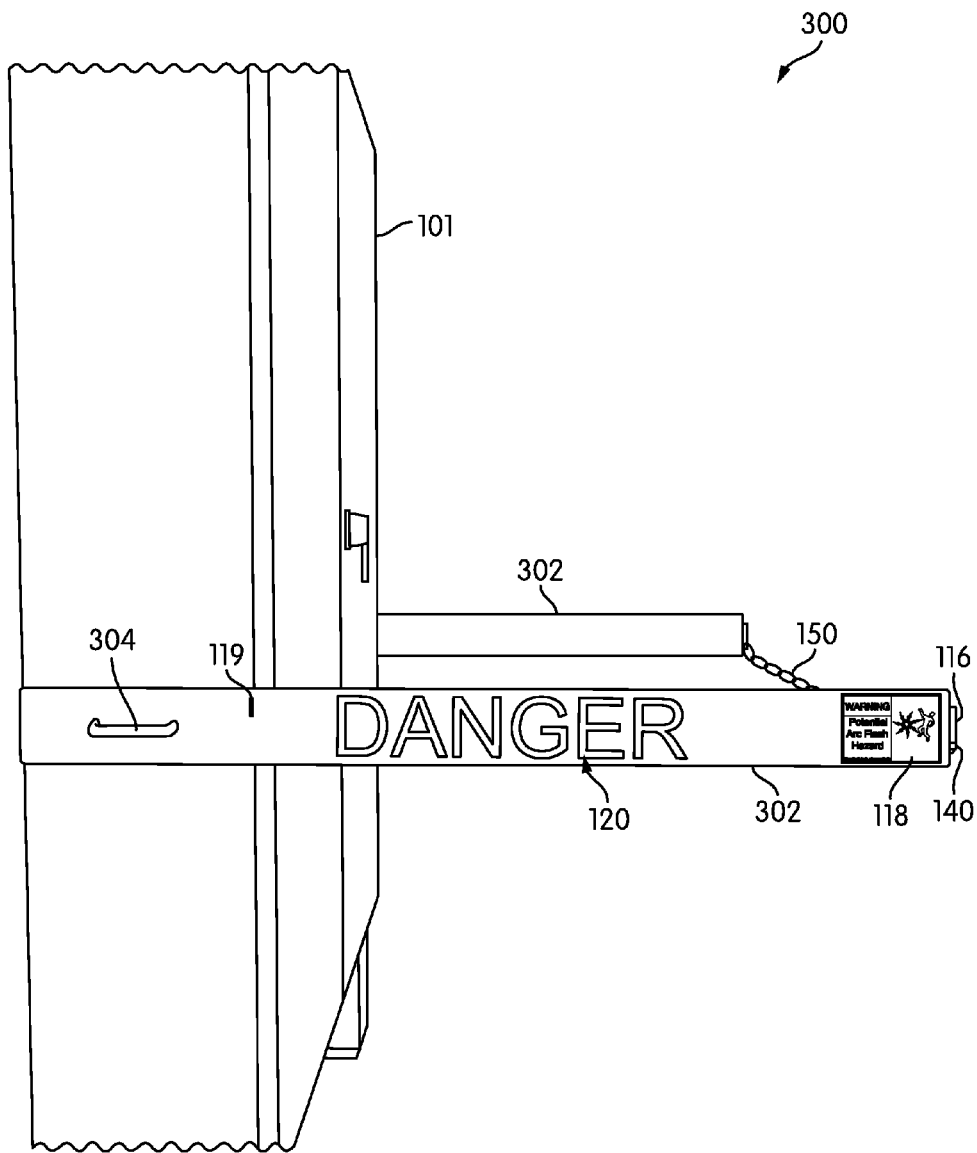
FIG. 6 is a perspective view of yet another embodiment of a caution and barrier system with magnetically fastened and detachable arm components, shown in the horizontal position.
Figure 7A:
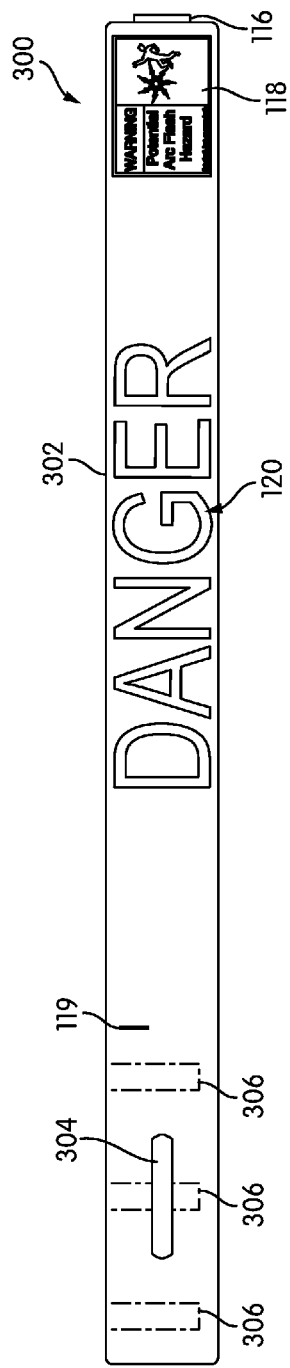
Figure 7B:
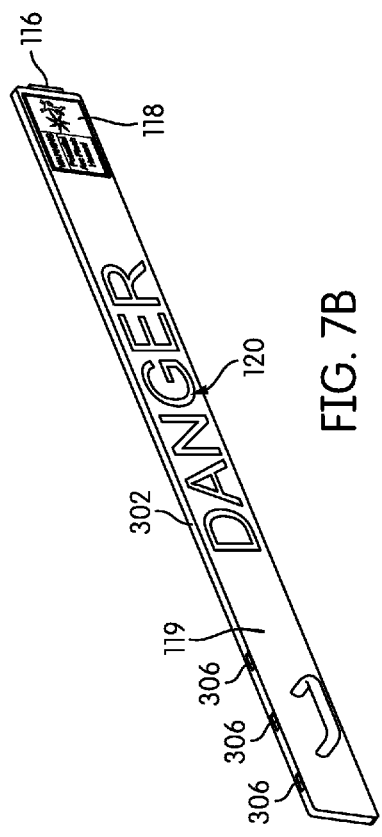
Figure 8:
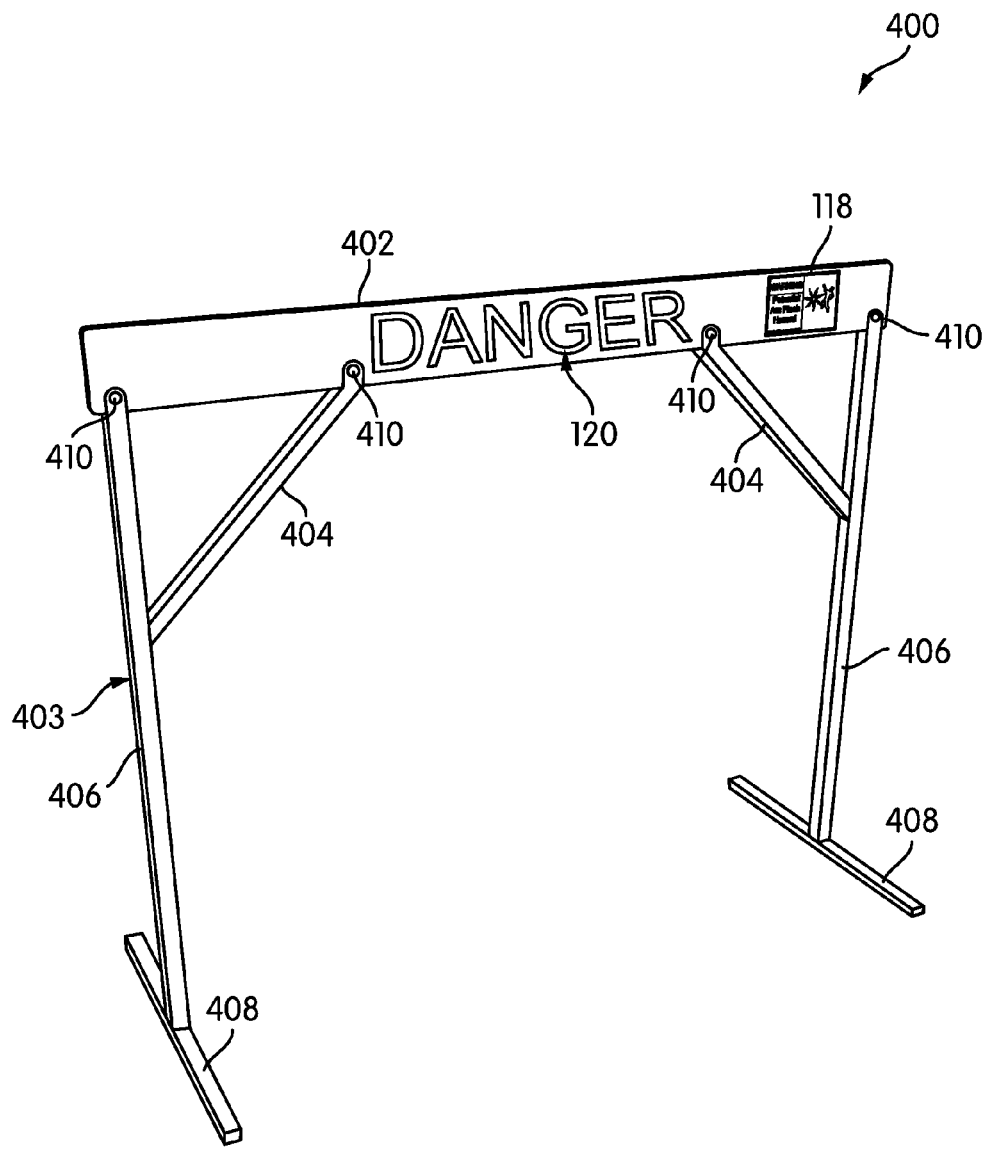
Figure 9:
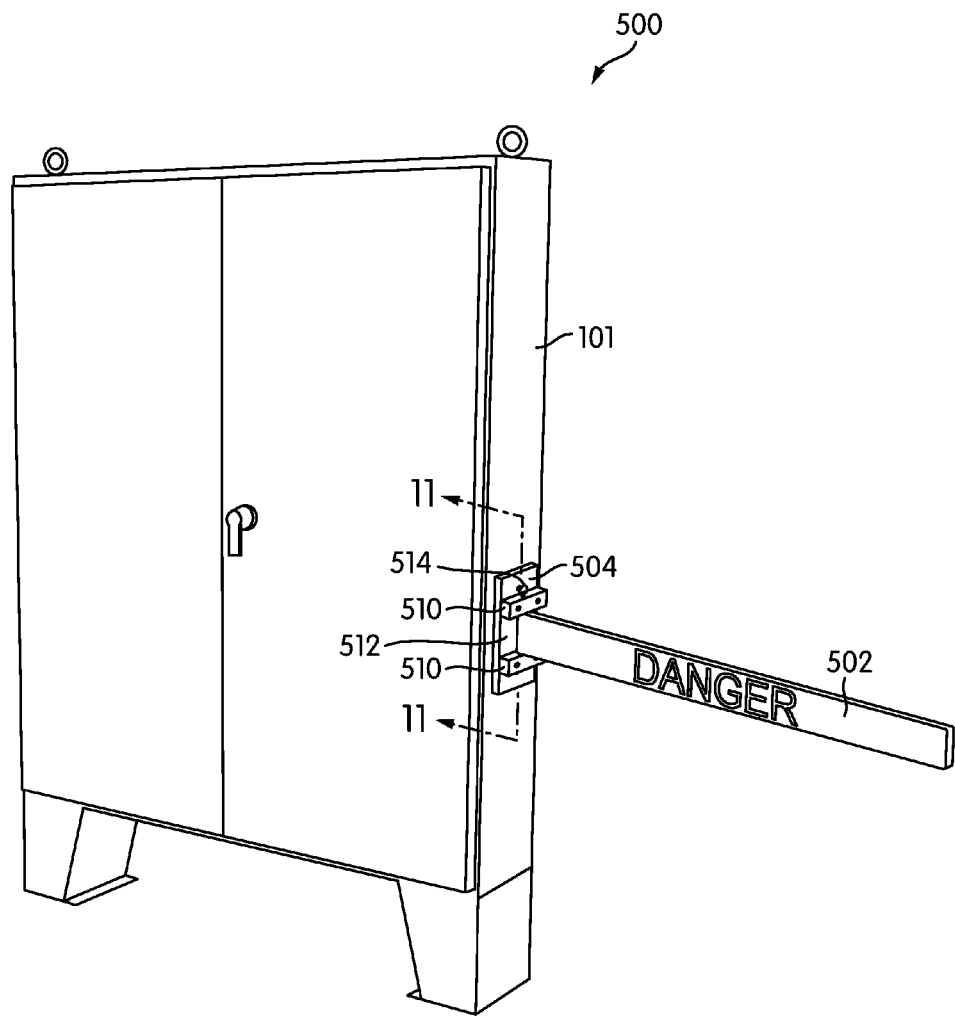
Figure 10:
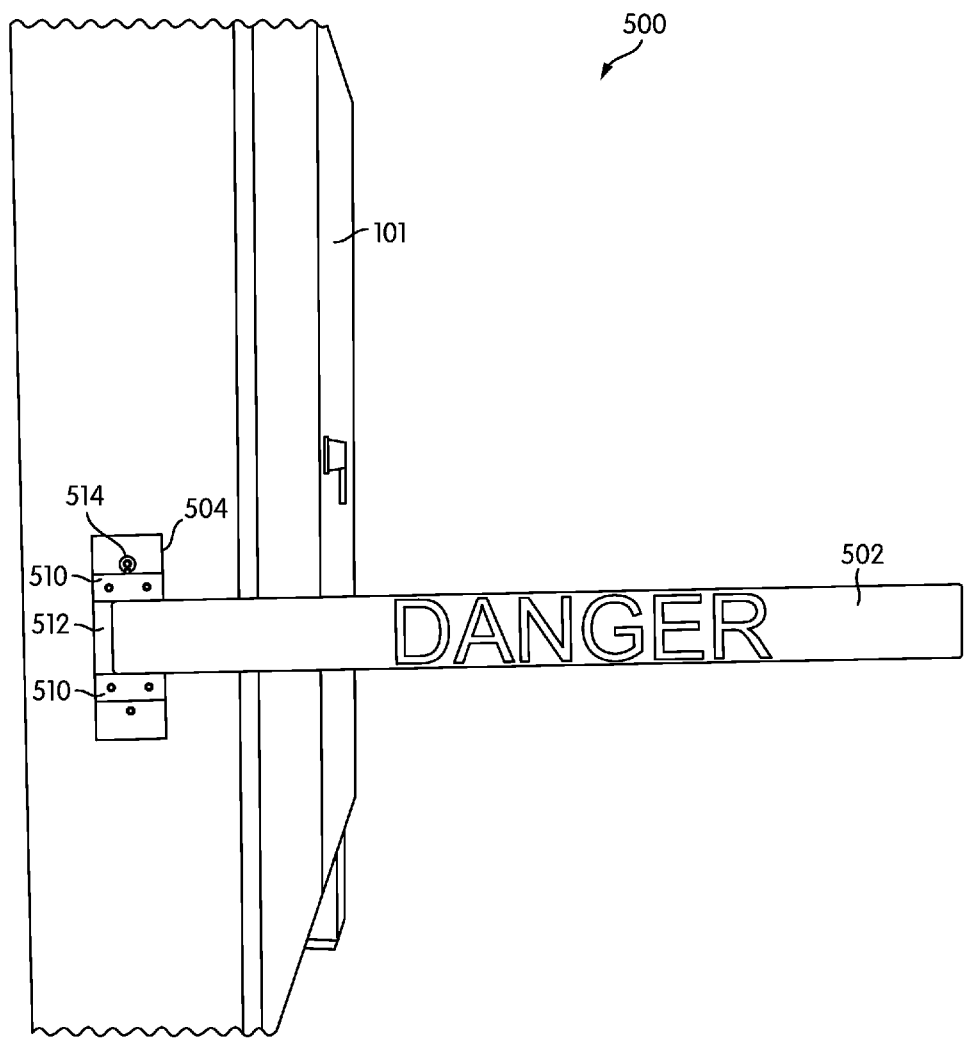
Figure 11:
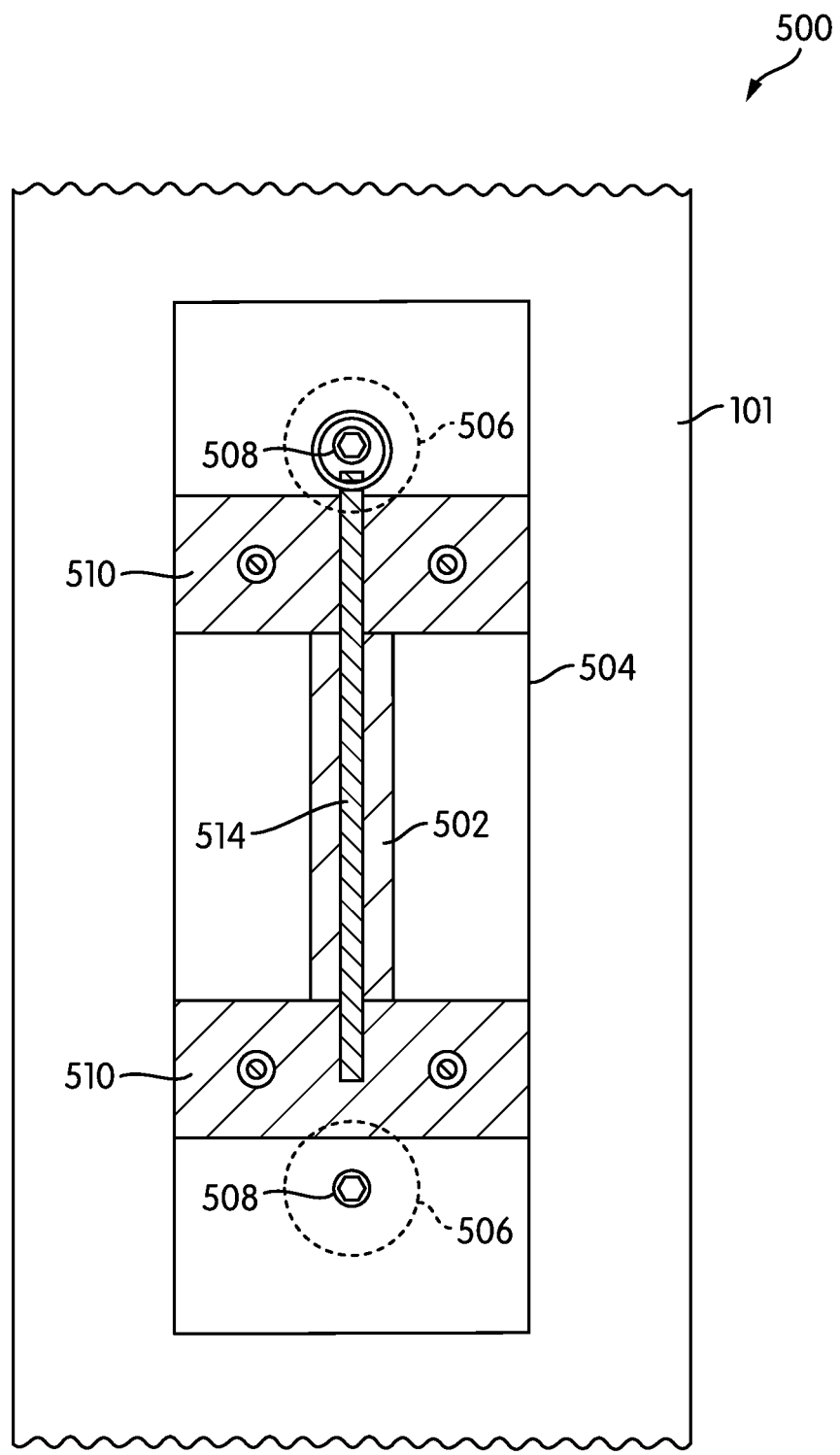

FIGS. 7A-B are side elevational and perspective views, respectively, of one of the arms of FIG. 6 in isolation; and FIG. 8 is a perspective view of the caution and barrier system in a freestanding embodiment;

FIG. 9 is a perspective view of a caution and barrier system according to yet another embodiment of the invention, illustrating a warning arm mounted in a universal mount in a first position;

FIG. 10 is a perspective view of one side of the cabinet shown in FIG. 9, illustrating the warning arm mounted in a second position; and FIG. 11 is a cross-sectional view taken through Line 11-11 of FIG. 9.

DETAILED DESCRIPTION

Figure 1:
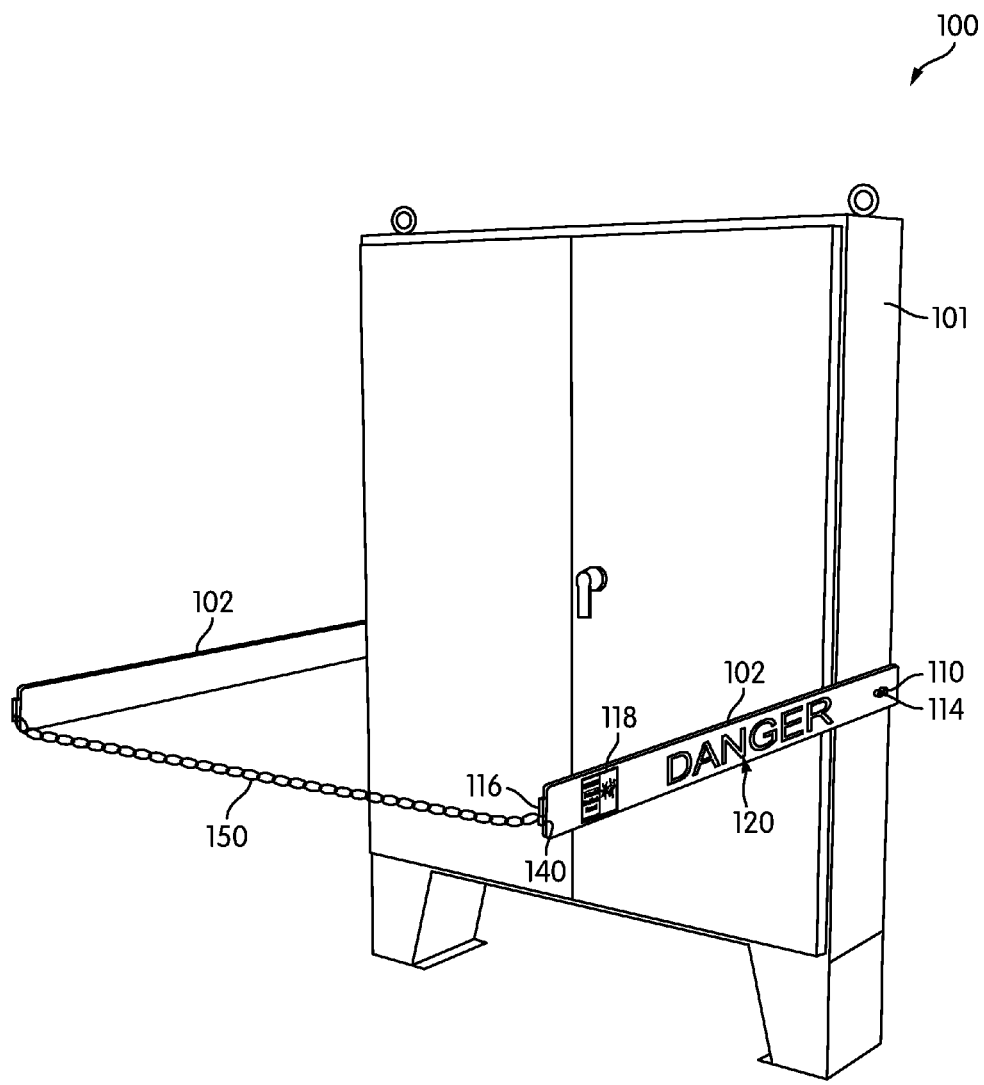
FIG. 1 is a perspective view of a caution and barrier system for danger of electrical arcing, shown attached to a cabinet with pivoting arm components in a horizontal position.

FIG. 1 is a perspective view of a caution and barrier system for danger of electrical arcing, generally indicated at 100, according to one embodiment of the invention. The system 100 may be attached to a wide array of equipment, and provides both a visual warning of arcing danger and a physical barrier to prevent users from coming close enough to a piece of equipment to experience an arc flash. (For purposes of this description, the phrases "electrical arc," "arc flash," and "arc fault" may be taken to be essentially synonymous.)

As shown in FIG. 1, a pair of guard arms 102 is attached to a cabinet 101 and extends from it. Each guard arm 102 contains warning indicia 120 which may for example be engraved, painted or adhered to it (e.g., in the form of a sticker). In the illustrated embodiment, the color of each guard arm 102 may act as one warning indication 120, and separate stickers, plates, or other types of indicia 118 may be fixed at particular positions to provide additional warning indications. For example, each guard arm 102 may be red, orange, or another common warning color. Any additional stickers, plates, or placards 118 may conform to regulatory requirements or standards in describing the nature of the danger and required precautions and may use standard graphical symbols or words.

The guard arms 102 are mirror images of each other, and each one includes similar components. They may be made of various non-conductive materials such as polymers, rubbers, or natural materials. Essentially any material may be used to make the guard arms 102; however, non-conductive materials should generally be used.

A front detachable barrier 150 may be used to close the space between the front ends of the guard arms 102. The barrier 150 may be a rope, chain, or plank of a non-conductive material. In the illustration of FIG. 1, the front detachable barrier 150 comprises a plastic chain that attaches to the front tips of the guard arms 102 using magnetically attractive material 140 attracted to magnetic coupling plates 116 attached to the front tips of the guard arms 120. In other embodiments, the front detachable barrier 150 may be attached using eyebolts, hooks, snaps, or other conventional releasable fasteners. Whatever form it takes, the detachable barrier 150 is most advantageously constructed and adapted to be detached and moved aside to allow access to the cabinet 101 when necessary.

Figure 2:
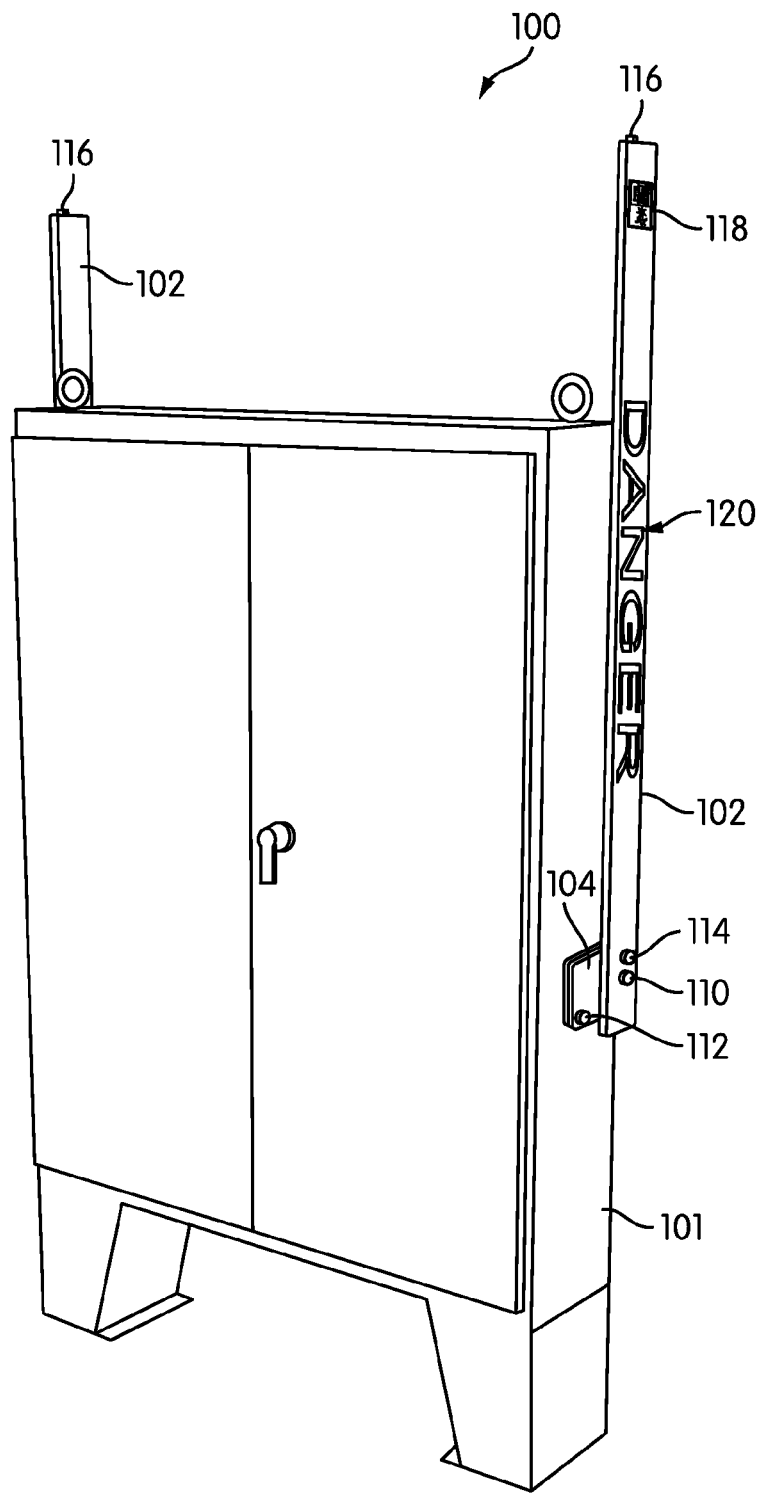
FIG. 2 is a perspective view of the caution and barrier system of FIG. 1 with arm components pivoted into a vertical position.

FIG. 2 is a perspective view of the caution and barrier system 100 as described above, but with the front detachable barrier 150 removed and guard arms 102 in a vertical position. The guard arms 102 rotate about pivot posts 110 and sit on resting posts 112 in the horizontal position. Locking tabs 114 are provided to secure the guard arms 102 in the vertical position; they remain in the guard arms 102 and can be pushed into an opening (not shown in FIG. 2) to lock the guard arms 102 upright in the vertical position. The vertical position illustrated in FIG. 2 allows for access to a piece of equipment or the cabinet 101 itself.

FIG. 3A is a side elevational view detailing a guard arm 102 of the caution and barrier system 100 in isolation. The guard arms 102 may be of any suitable length, depending on how much space is required in order to ensure worker safety and equipment integrity, which will vary with the type of equipment and other factors. Safe distances for arc flash hazards can be calculated using conventional methods, such as the IEEE 1584 Guide for Performing Arc Flash Hazard Calculations (Institute of Electrical and Electronics Engineers, New York, N.Y., USA, 2002). For example, in the embodiment depicted in FIG. 3A, the guard arms 102 may be about 60 inches long (a safe distance) by about 4 inches high (a suitable height for the indicia 120 and the additional indicia plate 118). The indicia plate 118 of the illustrated embodiment is set about 4 inches from the tip of the guard arm 102 and sets the beginning of the guard arm indicia at about 12 inches from the beginning of the guard arm 102. In the illustrated embodiment, placement indicia 119 marks the point at which the guard arm 102 should be aligned with the forward edge of the cabinet 101, in order to ensure that a sufficient length of the arms 102 extends beyond the cabinet 101.

The magnetic coupling 116 may be attached to the front end of the guard arm 102 using an assortment of fasteners such as screws, bolts, rivets, posts, or adhesives. In the illustrated embodiment, the magnetic coupling 116 is attached utilizing two post-like fasteners. Alternatively, eyebolts, hooks, or other means of securing the front detachable barrier 150 may be attached in substantially the same place, and in substantially the same manner, as the magnetic coupling 116.

The guard arms 102 are designed for permanent mounting to the cabinet 101. As shown in the side perspective view of FIG. 3A, the guard arms 102 are attached to an outer fastening plate 104 which acts as one part of the fastening mechanism that secures each guard arm 102 to the cabinet 101. A corresponding inner fastening plate 106 on the inside of the cabinet 101, shown in the top plan view of FIG. 3B, completes the attachment of each guard arm 102 to the cabinet 101. In certain embodiments, only the outer fastening plate 104 may be needed to secure a guard arm 102 to the cabinet 101. For example, the outer fastening plate 104 may be welded or adhered to the cabinet 101.

The size of the fastening plates 104, 106 and the materials of which they are made may vary from embodiment to embodiment. Considerations that may be taken in account when selecting the materials of the fastening plates 104, 106 include the weight of the guard arms 102; the motion, stresses, and wear and tear of pivoting the guard arms 102 into their respective resting positions; the stresses of attaching the caution and barrier system 100 to the cabinet 101 or other equipment; and the stresses and wear and tear on the locking mechanism 114 to put the guard arms 102 into the vertical position. Aluminum is one suitable material for the fastening plates 104, 106, although in other embodiments and installations, other types of plastic or metal may be used.

The outer fastening plate 104 may include a number of openings 122 to accommodate a range of fasteners, such as bolts, screws, posts or rivets, and openings 122 may be threaded or non threaded depending on the fasteners selected. The number of openings 122 may vary depending on the specific application of the caution and barrier system 100, and each one of the openings 122 may vary in size and characteristics, but in the embodiment depicted in FIGS. 1 and 2, four openings are included in the outer fastening plate 104.

FIG. 3B shows the details of the fasteners used to mount and secure the guard arms 102. Specifically, the pivot post 110 may be a partially threaded or unthreaded fastener of a material capable of supporting the weight and pivoting action of the guard arms 102, and may attach to the inside fastening plate 106 by means of, for example, complementary engaging screw threads, adhesives, press-fitting, welding, or any combination of attachment means, depending on the application. In some embodiments, the pivot post 110 may be a simple shaft, and the guard arm 102 may rotate about it. In that case, a between the guard arm 102 and the outside fastening plate 104, a friction relief mechanism, such as a washer made of a low friction material like plastic, may be provided to aid the pivoting motion of the guard arm 102. However, the rotation mechanism may be more complex in other embodiments. For example, the pivot post 110 could be associated with a bearing or bushing which supports the guard arm 102 in rotation and reduces both frictional forces and wear.

A rod of suitable material may act as a resting post 112 for the guard arm 102 to rest on top of while in the horizontal position and to stop the movement of the guard arm 102 past the vertical or 90-degree position. The resting post 112 may be non-threaded or semi-threaded, as depicted in FIG. 3B, and may be attached to and/or engaged with the outer fastening plate 104 in any suitable fashion.

As shown, the locking tab 114 can be placed through an opening in the outer fastening plate 104, transit the wall of the cabinet 101, and lock into the inner fastening plate 106.

FIG. 3C, a exploded perspective view, shows the opening 128 for the locking tab 114, used when the locking tab 114 secures the arm 102 in a vertical position, as well as additional openings 122 in the outer and inner fastening plates 104, 106 that allow these plates 104, 106 to be attached to the cabinet 101 and other surfaces. FIG. 3C also illustrates that the magnetic coupling 116 has fastener openings 132 in it, and corresponding openings 134 are provided in the front ends of the guard arms 102 to secure the magnetic couplings 116.

FIG. 3D, a side elevational exploded view, illustrates the arrangement of the pivot post 110, resting post 112, guard arm 102, magnetic coupling 116, washer 108, outer fastening plate 104 and inner fastening plate 106.

Figure 4:
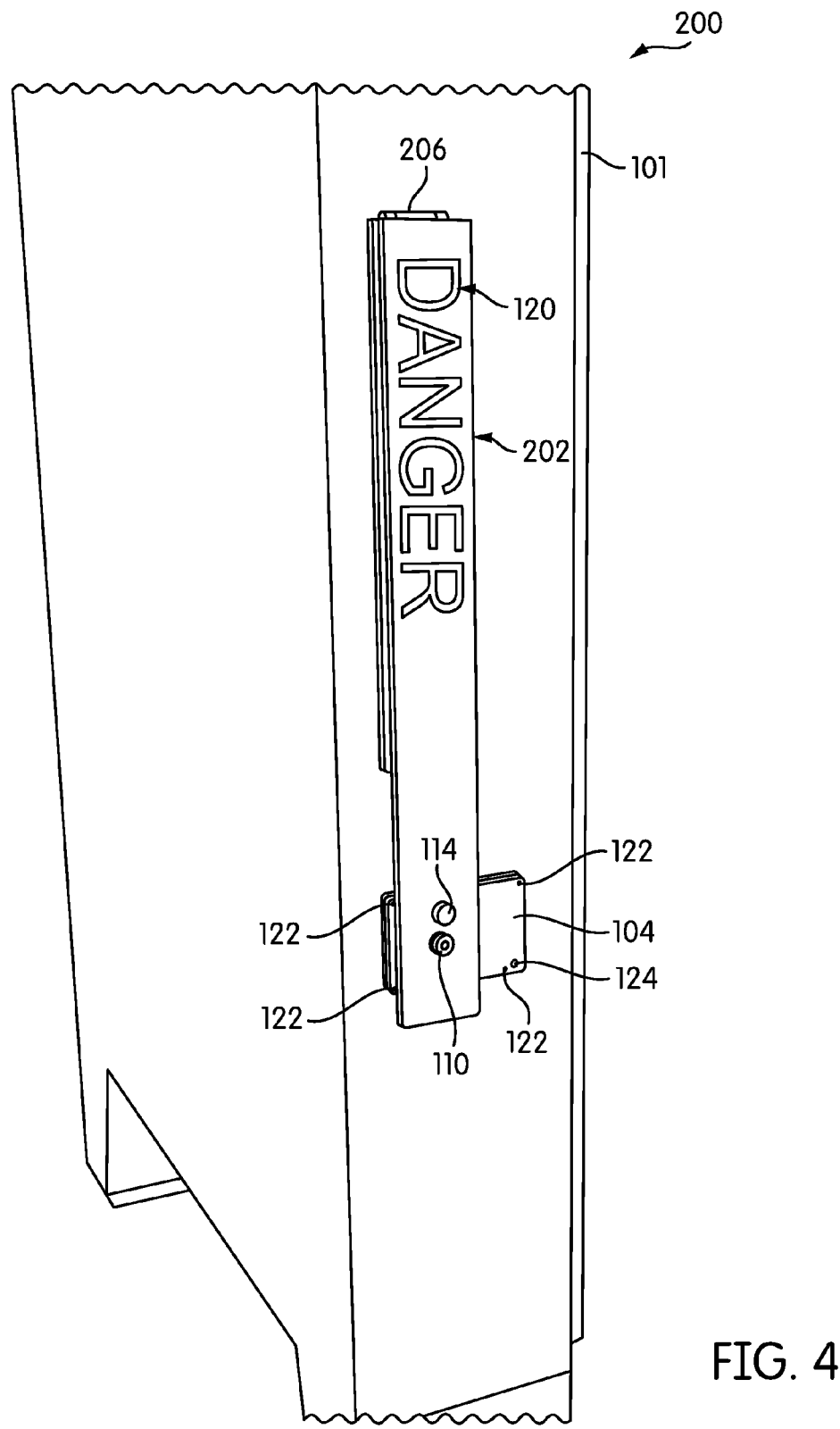
FIG. 4 is a perspective view of another embodiment of the invention with hinged and foldable arm components, shown in the vertical position.

As those of skill in the art will realize, although the guard arms 102 may be made in any length necessary to create a safe space around a piece of equipment 101, particularly long lengths may be difficult to manufacture and cumbersome to ship and use. To address this issue, FIG. 4, a perspective view of a hinged guard arm caution and barrier system, generally indicated at 200, includes a pair of hinged guard arms 202 that can be folded along their lengths. The system 200 is otherwise similar to the system 100 described above. However, the hinged arms 202 can be folded to more easily respect vertical and horizontal clearances, they can be manufactured in sections, and they can be handled more easily when folded for shipping and installation purposes.

FIG. 5A is an elevational view of a hinged guard arm 202 with the hinging mechanism 206 arranged such that each arm 202 can be folded inwards towards the cabinet 101. The hinged guard arm 202 may utilize a common hinging mechanism 206 made of durable materials to support the weight and wear and tear of folding the hinged guard arm 202. The embodiment illustrated in FIG. 5A utilizes four holes or openings 208 for the use of fasteners join the hinging mechanism 206 to two guard arm 202 segments. The number of holes or openings may differ from embodiment to embodiment considering factors such as height, weight, and number of sections making up each guard arm 202.

FIGS. 5B-5D are top plan, perspective, and end elevational views, respectively, of one of the guard arms 202 in isolation. Except for the inclusion of the hinging mechanism 206, the guard arms 202 are similar to the non-hinging embodiment of the caution and barrier system 100 described in FIGS. 1-3D.

As is apparent from the above description, systems 100 and 200 actually modify the piece of equipment 101, typically by drilling or punching holes or openings in walls of the piece of equipment 101 to secure the guard arms 102, 202. However, there will be situations in which this is not possible or not desirable. Therefore, other embodiments of the invention provide for attachment mechanisms that do not modify the piece of equipment 101, as will be described below in more detail. These embodiments may also pivot by means described above.

FIG. 6 is a perspective view of a caution and barrier system for electrical arcing generally indicated at 300, with magnetic attachment and detachment. This embodiment utilizes a pair of magnetically attachable/detachable arms 302 that are mirror images of one another. Specifically, each arm 302 has one or more magnetic fasteners 306 embedded in it or attached to it near one of its ends. The magnetic fasteners 306 may be, for example, ceramic magnets or rare earth magnets that have sufficient magnetic attractive force to attach to a ferromagnetic wall of the piece of equipment 101. Other embodiments may use suction cups or adhesives as fastening mechanisms.

Each arm 302 also includes a handle 304. The handles 304 may be composed of various materials. They may be molded or machined as part of the magnetically attachable/detachable arms 302, or they may be separate removable components attached with fasteners such as bolts or screws. The handles 304 may be of the same or different materials than the arms 302 themselves.

FIG. 7A is a side elevational view of one of the magnetically attachable/detachable arms 302 in isolation. The magnetically attachable/detachable arms 302 may be, for example, a length of 48 inches in this embodiment. The handle 304 in this embodiment is positioned about 4 inches from the attachment end of the magnetically attachable/detachable arm 302 and extends along the length of and to the front of the arm 302.

FIG. 7A and FIG. 7B, a perspective view, illustrate the placement of three magnetic elements 306 within the guard arm 302. In the illustrated embodiment, the magnetic elements 306 are depicted as embedded inline within the thickness of the arm 302, allowing its outer surface to be contiguous, smooth, and to rest flush against the piece of equipment 101. However, it should be understood that the magnetic elements 306 may be attached, for example, to the inner surface of each guard arm 302, such that they are not embedded within it.

Although the guard arms 102, 202, 302 were described above as being used in mirror-image pairs, in some embodiments, arms 102, 202, 302 of different types may be used together. For example, a hinging arm 202 may be paired with a non-hinging arm 102.

FIG. 8 is a perspective view of a freestanding caution and barrier system embodiment generally indicated at 400, which in itself does not attach to any particular piece of equipment. This may be useful for providing a safe space for temporary work areas or for equipment or machinery for which there is no feasible means of attachment. The freestanding caution and barrier system 400 may comprise a guard arm 402 and a stand 403. The guard arms 402 are similar to those described above containing indicia 120, indicia plates 118, or any other types of indicia including color as described above. The guard arm 402 may be any suitable length to provide the safe barrier needed to avoid opportunities for electrical arcing.

The guard arms 402 rest on the stand 403 by way of a number of holding brackets 410, each of which has a number of vertical support arms 406 intended to make contact directly or indirectly with the floor. Angled support arms 404 rigidify the structure of the stand 403 and provide support to the guard arm 402 along its length. The brackets 410 and guard arms 402 may include openings for fasteners similar to those described above. Angled support arms 404 may be at any angle, including completely horizontal. Footing structures 408 receive the arms 404, 406 and contact the floor. The stand 403 may be constructed of suitable materials, such as metals, plastics, or other natural or synthetic materials. In some embodiments, the stand 413 may be freestanding without the guard arms 402 inserted; in other embodiments, the holding brackets 410 may be collapsible and may require the guard arms 402 to form a freestanding, stable structure.

Although a single guard arm 402 is supported by brackets at both ends in the illustrated embodiment, a single bracket may support the guard arm 402 in other embodiments, positioned either at one end of the guard arm 402 or in the center. That single bracket may be supported by a vertical support member with a suitable foot mechanism.

In the description above, the guard arms 102, 202, 302, 402 are positioned in a single position, in most cases forward of the cabinet 101 or piece of equipment. However, in some cases, it may be useful for the guard arms to be positionable in different positions.

FIG. 9 illustrates an embodiment of a caution and barrier system 500, in which a guard arm 502 (only one guard arm 502 is shown in the view of FIG. 9, although the guard arms 502 would typically be used in pairs) is attached to a cabinet 101 or piece of equipment using a "universal" or "multi-position" mount 504.

The mount 504 itself has magnets on its rear surface that allow it to attach magnetically to the cabinet 101. Specifically, two round magnets 506 are secured to the mount 504 by bolts, machine screws, rivets, or other fasteners 508. (The two magnets 506 are shown in phantom in the view of FIG. 11.) In other embodiments, the base layer of the mount 504 may be made of a ferromagnetic material, making separately attachable magnets 506 unnecessary.

The mount 504 is arranged to allow the guard arm 502 to extend either parallel to the mount 504 or angled with respect to it. Two raised guides 510, which are metal blocks in the illustrated embodiment, define a slot 512 with a width just larger than the height of the guard arm 502. That slot 512 accommodates and supports the guard arm 502 in either the parallel or angled positions. A pin 514 inserts through the top guide 510 into the guard arm 502 to retain it in the mount 504. If the pin 514 is round, the guard arm 502 may pivot about it and thus be positioned at essentially any angle with respect to the mount 504. On the other hand, if the pin 514 is square, triangular, or some other shape and is inserted into a hole 516 in the guard arm 502 that has a complementary shape, the shape of the pin 514 and the location of its faces will limit and define the angular positions in which the guard arm 502 can be placed. FIG. 9 illustrates an angled position of the guard arm 502 in which the arm 502 extends perpendicular to the mount 504 and out to the side of the cabinet 101.

FIG. 10, a side perspective view, illustrates the parallel position of the guard arm 502, which is similar to the positions of the guard arms 102, 202, 302 of other embodiments.

FIG. 11 is a cross-sectional view of the guard arm 502 taken through Line 11-11 of FIG. 9, illustrating the interaction of the pin 514 and the guard arm 502. As shown, the guides 510 have openings, and the pin 514 transits those openings and the opening in the guard arm 502 to secure the guard arm 502 within the mount.

Although the above description focuses on the attachment of the guard arms 102, 202, 302, 502 to a cabinet 101, it should be clear that guard arms according to embodiments of the invention may be secured to any piece of equipment or any structure where a barrier is necessary. Additionally, although guard arms according to embodiments of the invention are particularly suited for use with electrical equipment, they can be used to form an effective barrier or secured space for any type of hazard. Moreover, they need not necessarily be attached to the same piece of equipment, so long as they extend in such a way to provide an appropriate barrier.

While the invention has been described with respect to certain embodiments, the embodiments are intended to be exemplary, rather than limiting. Modifications and changes may be made within the scope of the invention, which is defined by the claims.

What is claimed is:

1. A barrier and warning system, comprising:
   a pair of elongate arms, each of the arms including an attachment mechanism at a first end thereof, each of the attachment mechanisms being adapted to attach one of the pair of arms to one side of a piece of equipment, such that the pair of arms extend outwardly from the piece of equipment and generally parallel with one another, the pair of arms being mirror images of one another, carrying warning indicia on outwardly-facing surfaces thereof, and being made of a non-conductive material;
   a barrier member constructed and adapted to be detachably connected between the pair of elongate arms at second ends thereof so as to enclose a space around the piece of equipment.

2. The barrier and warning system of claim 1, wherein the attachment mechanism does not include a fixed pivot.

3. The barrier and warning system of claim 1, wherein the attachment mechanism comprises a fastening mechanism selected from the group consisting of magnetic fasteners, suction cups, and adhesives.

4. The barrier and warning system of claim 3, further comprising:
   one or more handles adapted to aid in the placement and removal of the elongate arms.

5. The barrier and warning system of claim 1, wherein the attachment mechanism does not modify the piece of equipment.

6. The barrier and warning system of claim 1, wherein the warning indicia is one or more of a color, a graphical indication, a placard, a sticker, or a word.

7. The barrier and warning system of claim 1, wherein each of the pair of elongate arms is a thin rectangular prism, such that the outwardly-facing surfaces are substantially flat.

8. The barrier and warning system of claim 7, wherein the attachment mechanism comprises one or more magnets placed proximate to the first ends of the pair of elongate arms.

9. The barrier and warning system of claim 8, wherein the one or more magnets are embedded within a thickness of each of the pair of elongate arms.

10. The barrier and warning system of claim 9, wherein each of the pair of elongate arms includes a handle on the outwardly-facing surface proximate to the first end.

11. The barrier and warning system of claim 1, wherein the barrier member is flexible.

12. The barrier and warning system of claim 11, wherein the barrier member comprises a rope or chain.

13. A barrier and warning system, comprising:
a pair of elongate arms, each of the pair of arms including one or more magnets proximate to a first end thereof in order to attach the arm to a piece of equipment, such that the pair of arms extend outwardly from the piece of equipment and generally parallel with one another, a handle on an outwardly-facing side proximate to the first end, and warning indicia on the outwardly-facing side, the pair of arms being mirror images of one another, and being made of a non-conductive material; and
a flexible barrier member constructed and adapted to be detachably connected between the pair of elongate arms at second ends thereof so as to enclose a space around the piece of equipment.

14. The barrier and warning system of claim 13, wherein the one or more magnets are embedded within each of the pair of elongate arms.

15. The barrier and warning system of claim 13, wherein the flexible barrier member comprises a rope or chain.

16. The barrier and warning system of claim 13, wherein each of the pair of elongate arms is a thin rectangular prism, such that the outwardly-facing surfaces are substantially flat.

* * * * *